United States Patent [19]

Otsu et al.

[11] 4,128,378

[45] Dec. 5, 1978

[54] EQUIPMENT FOR PRODUCING HIGH VOLTAGE RECTIFYING UNITS

[75] Inventors: Shinpei Otsu, Yokohama; Akira Sekiguchi; Nobuyoshi Tobita, both of Kamakura; Shigeru Chikamatsu, Fujisawa; Yoshihisa Hosoe; Motoaki Matsui, both of Yokohama; Noboru Sugimoto, Yokosuka; Noriyoshi Totsuka, Yokohama, all of Japan

[73] Assignee: Hitachi, Ltd., Japan

[21] Appl. No.: 836,594

[22] Filed: Sep. 26, 1977

[30] Foreign Application Priority Data

Sep. 29, 1976 [JP] Japan ................................ 51-115913

[51] Int. Cl.² .......................................... B29C 25/00
[52] U.S. Cl. .................................. 425/445; 425/4 R; 425/817 R; 425/DIG. 201; 29/729
[58] Field of Search ............... 425/817 R, 4 R, 445, 425/446, DIG. 201, DIG. 200, 88, 151, 453; 264/45.1, 46.6; 29/729

[56] References Cited

U.S. PATENT DOCUMENTS

| | | | |
|---|---|---|---|
| 2,937,408 | 5/1960 | Limpel | 264/311 X |
| 3,048,896 | 8/1962 | Marlo | 264/311 |
| 3,151,196 | 9/1964 | Tipton | 425/DIG. 201 X |
| 3,537,677 | 11/1970 | Cotton et al. | 425/4 R X |
| 3,611,480 | 10/1971 | Zippel et al. | 425/DIG. 201 X |
| 3,898,027 | 8/1975 | Milner | 425/DIG. 201 X |

*Primary Examiner*—Robert L. Spicer
*Attorney, Agent, or Firm*—Craig & Antonelli

[57] ABSTRACT

Equipment for producing a high voltage rectifying unit wherein there is a resin ingredient tank and a curing agent tank for storing separately the resin ingredient and the curing agent, a closed mixer for mixing the resin ingredient and the curing agent, a vacuum chamber for injecting a mixed thermo-setting resin composition into the high voltage rectifying unit, a chamber for defoaming the injected resin composition, a furnace for curing the injected resin composition by heating, and a carrier apparatus covered to isolate the external atmosphere which may carry the resin composition-injected high voltage rectifying unit from the defoaming chamber to the curing furnace, whereby the procedures from vacuum injection to curing can be carried out continuously and automatically.

5 Claims, 11 Drawing Figures

FIG. 10
FIG. 11
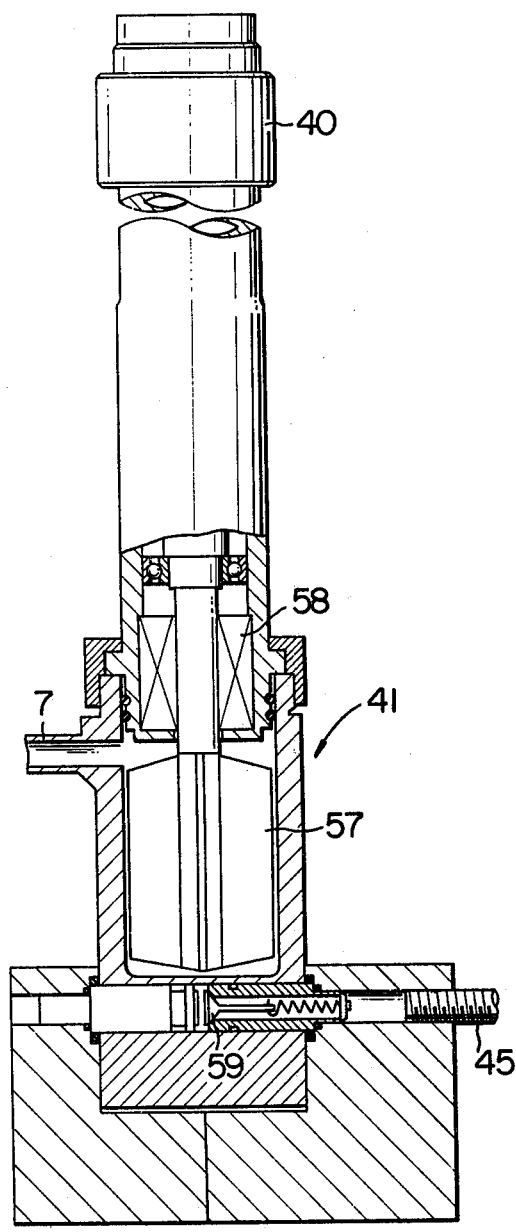
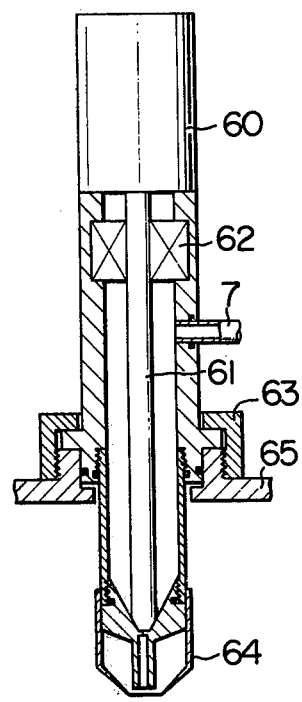

EQUIPMENT FOR PRODUCING HIGH VOLTAGE RECTIFYING UNITS

LIST OF PRIOR ART (37 CFR 1.56 (a))

The following references are cited to show the state of the art:
(1) Japanese Patent Kokai (Laid-Open) No. 122,571/74
(2) Japanese Patent Kokai (Laid-Open) No. 24,665/76

The present invention relates to an equipment for producing a high voltage rectifying unit. More particularly, the invention pertains to an equipment for producing a cast high voltage rectifying unit by injecting a liquid thermo-setting resin composition and curing the injected resin composition.

The rough structure of a high voltage rectifying unit will be explained below. A high voltage rectifying unit 1 is made up by, as shown in FIG. 1, installing necessary parts such as an inner bobbin $1d$ around which a primary coil $1b$ is wound, an outer bobbin $1e$ around which a secondary coil $1c$ is wound, diodes $1f$, etc. in a case $1a$ of a synthetic resin, carrying out necessary treatments such as wiring, injecting a liquid thermo-setting resin composition $1g$ into the assembly, and then curing the injected resin composition to form a fixed structure. Here, the liquid thermo-setting resin composition $1g$ bonds these parts fastly and affords required electrical characteristics such as insulating property, voltage resistance, etc. In order that the resin displays its properties enough and affords required characteristics, however, it is necessary for the resin composition $1g$ to fill and impregnate even the gaps between the wires wound as a coil without forming air bubbles. The quality of a product depends upon the quality of this treatment, and the method of this treatment is a great factor determining the production cost.

Next, a general equipment for producing a high voltage rectifying unit which has heretofore been performed will be explained. A prescribed number of high voltage rectifying units which have been assembled so that a liquid thermo-setting resin composition may be injected thereinto (hereinafter referred to as "product") are arranged on a jig, loaded on a truck, inserted into a preheating furnace as it is by hand operation, heated for a definite period of time, and then removed from the preheating furnace by hand operation. Thus, the drying and annealing of the product is carried out. Next, as described in Japanese Patent Kokai (Laid-Open) No. 122,571/74 and Japanese Patent Kokai (Laid-Open) No. 24,665/76, a liquid resin ingredient and a curing agent for injecting are defoamed, stirred and mixed by a stirrer in a vacuum state. The resin composition is charged to a vacuum chamber and defoamed by evacuating. An appointed weight or volume of the resin composition is measured by a meter and injected into said product which has been preheated and inserted into an injection chamber by hand operation as described above. The resin composition-injected product is then removed by hand operation. When the amount of the thus treated products reached a definite amount, these treated products are loaded on a truck and inserted by hand operation into a curing furnace heated according to a prescribed profile, where the products are heated and cured to yield finished products. However, said thermo-setting resin composition used for injecting contains various additives, and some of the resin itself, a mixed solution and the gaseous substances generated may be harmful to a human being. It is not allowable for operators to touch directly these harmful substances or inhale them before the resin is completely cured. Therefore, it has been necessary to take any safety measures in all of the preparatory operation necessary for resin injection, the injection operation, the curing treatment and transportation operations between the respective steps. Although prior art equipments for injecting the liquid thermo-setting resin composition are equipped with a means for measuring, mixing and continuously injecting the resin composition, the inside in a vacuum is returned to atmospheric pressure every time the products are supplied or removed and the inside is evacuated from atmospheric pressure to a prescribed degree of vacuum every time the resin composition is injected. Therefore, operation efficiency has been very poor, the operators must carry the products, into which the resin composition has been injected to a certain degree, by hand operation when supplementarily injected, and there have many problems from a viewpoint of said operational environment. Also, since a batch method has been employed in the curing furnace as described above, it has been necessary to control the products in each lot to ensure a correct curing temperature profile and operation control has been difficult. Further, operation efficiency has been very low.

An object of the present invention is to provide an equipment for producing a high voltage rectifying unit wherein the defoaming, measuring and mixing of a resin ingredient and a curing agent, respectively, the vacuum injection of the resulting thermo-setting resin composition into the product, and the defoaming and curing of the resin composition injected into the product can be carried out continuously and automatically, which equipment is closed to isolate the external atmosphere, is safe against the toxicity of the resin, and is easy in quality control and excellent in operation efficiency.

Another object of the invention is to provide an equipment for producing a high voltage rectifying unit wherein a vacuum injection preparation chamber is provided before and adjacent to a vacuum injecting chamber for vacuum injecting a thermo-setting resin composition into a product, a defoaming chamber and a vacuum discharge preparation chamber are provided after and adjacent to said vacuum injecting chamber, and thereby vacuum injection and defoaming can be continuously carried out by opening and closing the respective gates without lowering the degree of vacuum in the vacuum injecting chamber and the defoaming chamber.

Another object of the invention is to provide an equipment for producing a high voltage rectifying unit wherein a resin ingredient and a curing agent each are stored and defoamed for a long period of time in the respective tanks, sealing of a meter, a mixer, transfer valves and injecting nozzles is ensured so that no air may leak out thereof, and as a result bubbling, overflow, etc. can be prevented and the resin composition can be injected smoothly and continuously into the product.

The other objects and advantages of the present invention will be apparent from the following description, taken in conjunction with the accompanying drawings in which:

FIG. 10 is an enlarged sectional view of a mixer as shown in FIG. 7.

FIG. 11 is an enlarged sectional view of an injecting nozzle as shown in FIGS. 3 and 4.

According to the present invention, there is provided an equipment for producing a high voltage rectifying unit, which equipment is provided with:

(a) a defoaming means for storing and vacuum-defoaming a resin ingredient and a curing agent, respectively, alone;

(b) a mixing means for mixing said resin ingredient and said curing agent at a prescribed mixing ratio which is connected with said defoaming means by a closed piping;

(c) a vacuum injecting chamber for injecting an appointed amount of the mixed and defoamed thermosetting resin composition into an assembled high voltage rectifying unit in a vacuum state through injecting nozzles connected with said mixing means by a closed piping, which vacuum injecting chamber is equipped with the first carrier apparatus which may load and intermittently carry said high voltage rectifying unit;

(d) a defoaming chamber for deforming the resin composition injected into the high voltage rectifying unit by evacuating to an appointed degree of vacuum which is provided adjacent to said vacuum injecting chamber and is equipped with the second carrier apparatus which may load and carry the inserted high voltage rectifying unit;

(e) a curing furnace for heating and curing the resin composition-injected high voltage rectifying unit continuously so that an appointed temperature profile may be formed along the carrying route of the third carrier apparatus, which is equipped with said third carrier apparatus for carrying the resin composition-injected high voltage rectifying unit through the curing furnace; and (f) the fourth carrier apparatus for carrying said high voltage rectifying unit from said defoaming chamber to said curing furnace, which fourth carrier apparatus is covered to isolate the external atmosphere, and in which equipment the procedures from the vacuum injection of the thermo-setting resin composition into the high voltage rectifying unit to the curing of the resin composition can thereby be carried out continuously and automatically.

Figure 1:
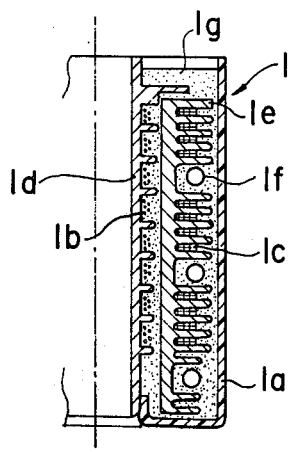
FIG. 1 is a sectional view of a high voltage rectifying unit produced according to the present invention.
Figure 2:
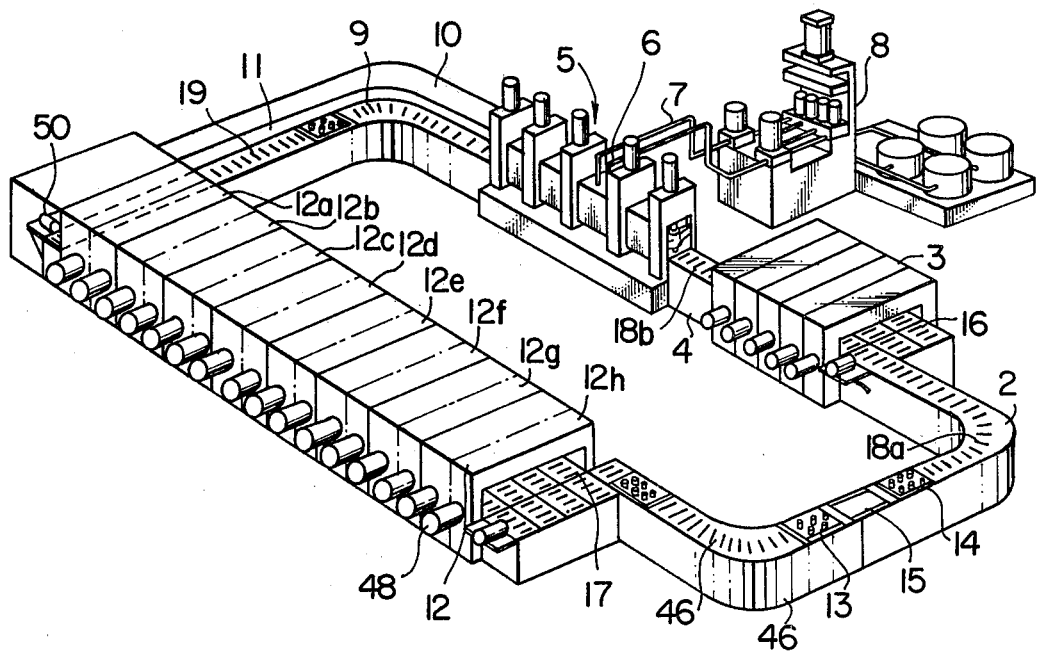
FIG. 2 is a perspective view showing the rough constitution of an example of an equipment for producing a high voltage rectifying unit according to the present invention.
Figure 3:
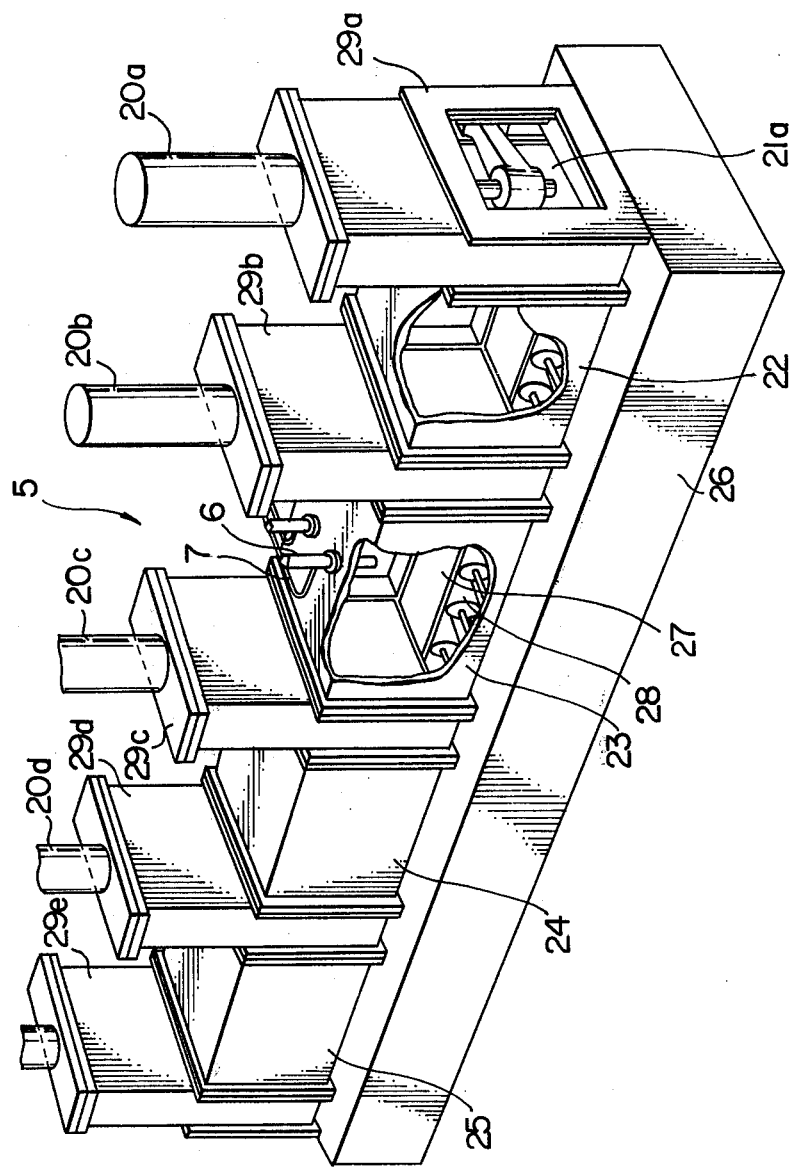
FIG. 3 is an enlarged perspective view of a vacuum injector as shown in FIG. 2.
Figure 4:
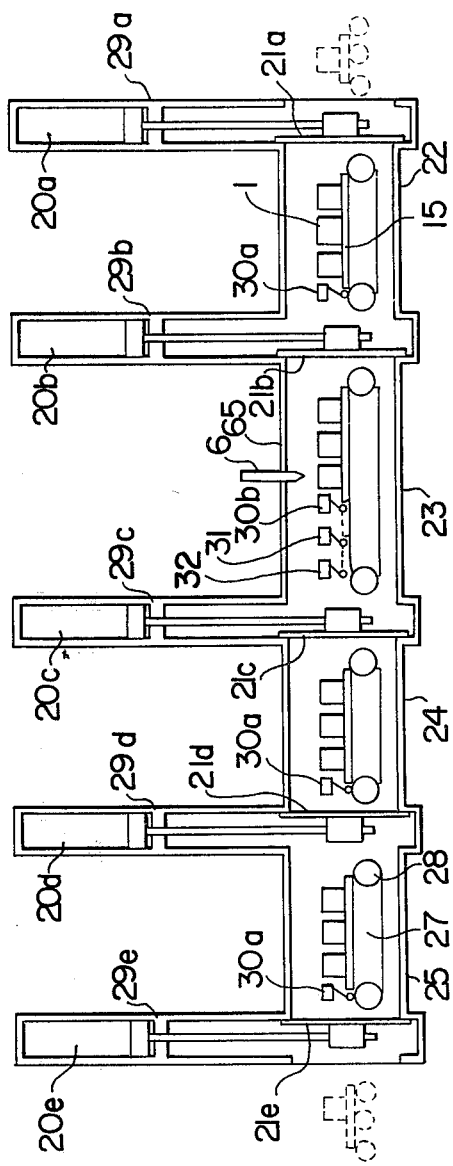
FIG. 4 is a sectional front view of the vacuum injector as shown in FIG. 3.

In FIG. 2, a carrying roller conveyor 2 connects the end of a finished product conveyor 46 with a preheating furnace 3 and rollers 18a driven by a driving means (not shown) are arranged on the conveyor 2 at appropriate intervals. The preheating furnace 3 has a tunnel-type heating means and the carrying conveyor 16 runs through the central part thereof. Since it is required that the carrying speed in the preheating furnace 3 is slower than that in the other places, three rows of the carrying conveyor 16 are arranged in parallel with one another and there is equipped such a means as the successive arrival of a jig 14 can be detected automatically at the end of the carrying roller conveyor 2 and the carried article can be transferred onto said carrying conveyor 16. A preliminary conveyor 4 connects the exit of the preheating furnace 3 with the inlet of a vacuum injector 5 and rollers 18b driven by a driving means (not shown) are arranged on the conveyor 18b at appropriate intervals. In FIG. 3 showing the vacuum injector 5, a gate valve 29a having a gate 21a which may open or close the path between a vacuum injection preparation chamber 22 and the open air, the vacuum injection preparation chamber 22 connected with a vacuum source, a gate valve 29b having a gate 21b which may open or close the path between the vacuum injection preparation chamber 22 and a vacuum injecting chamber 23, the vacuum injecting chamber 23 connected with a vacuum source and equipped with injecting nozzles 6 on its ceiling, a gate valve 29c having a gate 21c which may open or close the path between said vacuum injecting chamber 23 and a defoaming chamber 24, the defoaming chamber for further defoaming the thermo-setting resin composition, which has been injected into a product, in a vacuum, a gate valve 29d having a gate 21d which may open or close the path between the defoaming chamber 24 and a vacuum discharge preparation chamber 25, the vacuum discharge preparation chamber 25 connected with a vacuum source, and a gate valve 29e having a gate 21e which may open or close the path between the vacuum discharge preparation chamber 25 and the atmosphere on the discharge side are arranged on a platform 26 in this order and are fixed fastly with each adjacent other to form a closed unified assembly. Each tank is connected with a vacuum pump (not shown) by piping through a valve. In FIG. 4, the gates 21a, 21b, 21c, 21d and 21e in the gate valves 29a, 29b, 29c, 29d and 29e are suspended by air cylinders 20a, 20b, 20c, 20d and 20e, respectively, so that the respective gates may be moved up and down. When the respective gates descend, the opening is closed. On the bottom of the respective chambers 22, 23, 24, and 25, a carrier apparatus is provided wherein a rubber belt 27 is stretched between two pulleys 28. The pulleys 28 in the respective carrier apparatuses are connected directly with a driving means (not shown) so that they may be freely rotated and stopped and time interval rotation may be carried out. The vacuum injection preparation chamber (22), the defoaming chamber 24 and the vacuum discharge preparation chamber 25 each are provided with an inner stop limit switch 30a which works in agreement with the inserted jig 15 as carried to the end of the chamber on the chamber exit side. The vacuum injecting chamber 23 is equipped with an inner stop limit switch 30b which works when the inserted jig 15 has been carried to a convenient point for closing the gate 21b. Further, a second inner stop limit switch 31 and a third inner stop limit switch 32 are provided at equal intervals to those of product arrangement in the jig 15. The injecting nozzles 6 are fixed at a position corresponding to the position of a product 1 loaded on the jig when the jig 15 has been stopped for the first time by the working of the inner stop limit switch 30b. Returning to FIG. 2, an injected product conveyor 9 connects the exit of the vacuum injector 5 with a curing furnace 12 and rollers 19 driven by a driving means (not shown) are arranged on the conveyor 9 at appropriate intervals. Part of the conveyor 9 is covered by a barrier dome 10 made of, for example, a clear acrylic resin plate. The barrier dome 10 is connected with one end of a pipe (not shown), another end of which is in turn connected with an air conditioner (not shown) which cleans and exhausts the gas accumulated in the dome 10.

Figure 6:
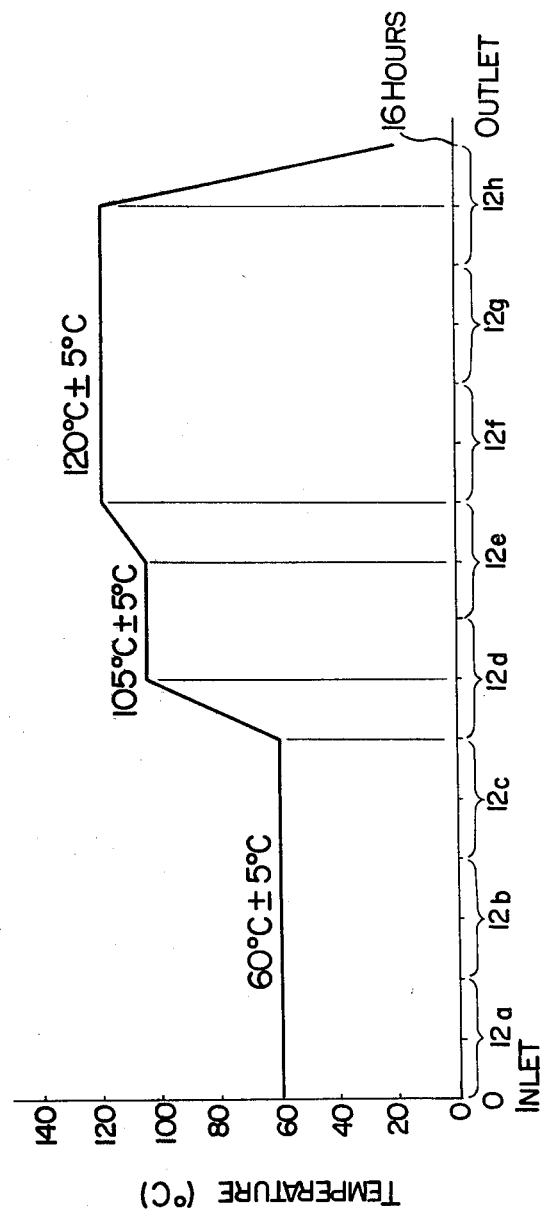
FIG. 6 shows a temperature profile formed along the transport direction in the curing furnace.

A conveyor 17 runs through the center of a tunnel-type heating means in the curing furnace 12. The heating means is connected with one end of a pipe (not shown), another end of which is in turn connected with an air conditioner (not shown) which cleans and exhausts the gas accumulated in the heating means, as in the barrier dome 10. It takes, for example, about 16 hours for the product to be carried from the inlet to the exit of the curing furnace 12. In the thus arranged heating zones, the products are heated according to the temperature profile as shown in FIG. 6. For example, the curing furnace 12 is made up of eight blocks 12a, 12b, 12c, 12d, 12e, 12f, 12g and 12h so that the number of frames may be minimized. Each block is separated into two compartments which are separately subjected to temperature control. Thus, 12a, 12b and 12c are high temperature compartments kept at 60° C. ± 5° C., the righthand half of 12d and the lefthand half of 12e are high temperature compartments kept at 105° C. ± 5° C., and 12f, 12g and the lefthand half of (12h) are high temperature compartments kept at 115° C. ± 5° C. These 16 high temperature compartments are confined and closed leaving a space enough for the conveyor 17 to pass through each compartment together with the jig loaded with the product.

Figure 5:
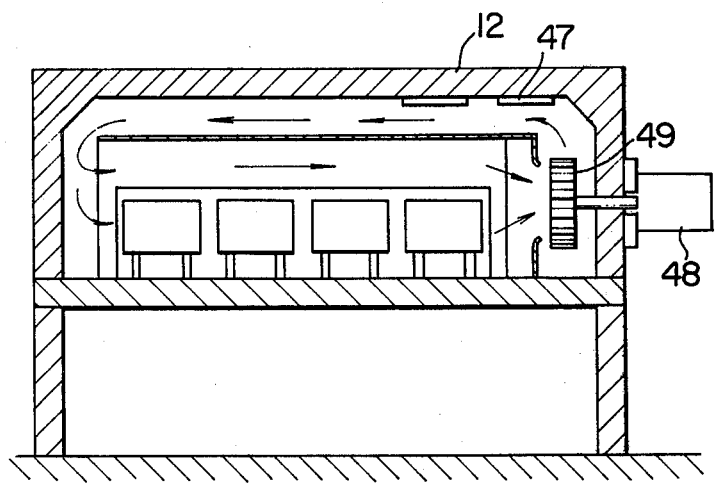
FIG. 5 is a sectional view of a curing furnace as shown in FIG. 2.
Figure 7:
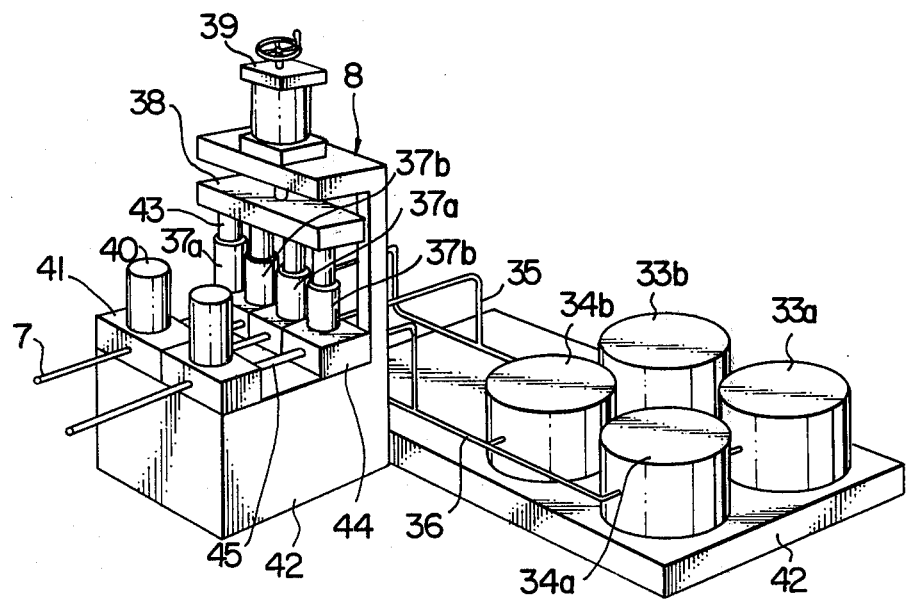
FIG. 7 is an enlarged perspective view of an injector as shown in FIG. 2.
Figure 8:
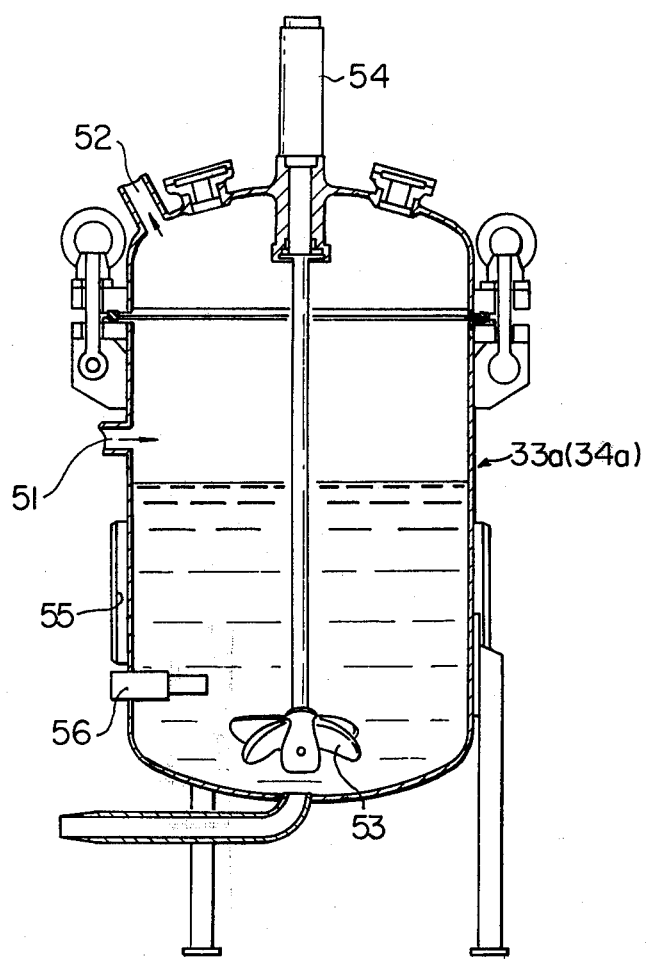
FIG. 8 is an enlarged sectional view of a chamber structure as shown in FIG. 7.

As shown in FIG. 5, the respective high temperature compartments are equipped with heaters on their upper wall, and hot air is circulated from their ceiling to the products as shown by arrows by a fan 49. Returning to FIG. 2, a door (not shown) provided at the inlet of the curing furnace 12 is opened or closed synchronously with a pusher 50 for loading the jig 15 carried by an injected product conveyor 9 onto the conveyor 17 arranged in four rows successively. Also, an air curtain is formed at both the inlet and exit of the curing furnace 12. In order to remove the gas in the curing furnace and reduce the influence of the adjacent high temperature compartment, a forced air supply duct (not shown) is provided in the lefthand half of the high temperature compartment 12a and a forced exhaust duct (not shown) in the righthand half of the compartment 12h. Further, a fan is provided in the forced exhaust duct. As a result, a slight hot air is circulated from the inlet to the exit of the curing furnace. Air at room temperature is blown into the high temperature compartment on the right of 12c to reduce the influence of the compartment at 105° C. A finished product conveyor 46 connects the exit of the curing furnace 12 with the end of the carrying conveyor 2 and rollers 46 driven by a driving means (not shown) are provided on the finished product conveyor 46 at appropriate intervals. The jig 15 is a rectangular flat plate which has be made so that the products can be correctly positioned and fixed in two rows and three lines. In FIG. 7, a resin ingredient tank 33a, a preliminary resin ingredient tank 33b, a curing agent tank 34a and a preliminary curing agent tank 34b are all closed containers having an appropriate inlet 51 as shown in FIG. 8. Also, a pipe 52 is connected with a vacuum pump (not shown) and an air compressor (not shown) through a selector valve (not shown). Further, the resin ingredient tanks 33a and 33b and the curing agent tanks 34a and 34b each are equipped with an agitator 53, a motor 54 for driving and rotating said agitator, a band heater 55 for heating the two materials to lower their viscosity and a thermostat thermocouple 56 for measuring the temperature of the two materials and maintaining the two materials at an appointed temperature by the on-off control of said band heater 55.

Figure 9:
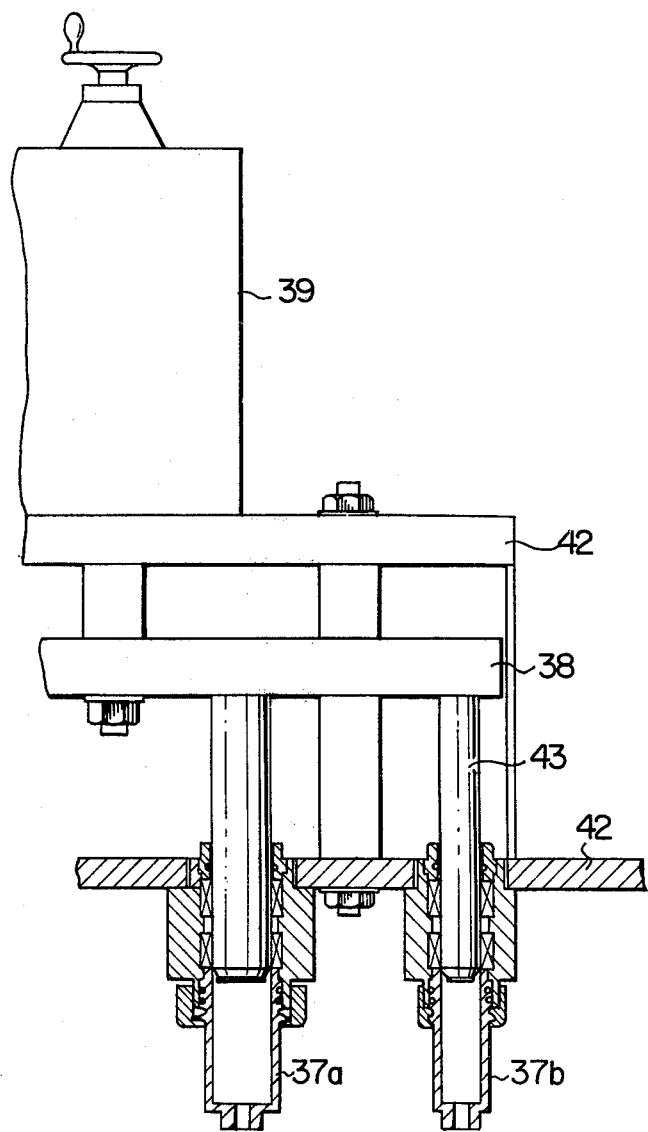
FIG. 9 is an enlarged partially sectional view of a meter as shown in FIG. 7.

Returning to FIG. 7, one end of a resin ingredient pipe 35 is connected with the resin ingredient tank 33a and the preliminary resin ingredient tank 33b through a selector valve (not shown), and the other end of the pipe 35 is connected with a check valve 44 for a resin ingredient measuring cylinder 37a. Likewise, one end of a curing agent pipe 36 is connected with the curing agent tank 34a and the preliminary curing agent tank 34b through a selector valve (not shown), and the other end of the pipe 36 is connected with a check valve 44 for a curing agent measuring cylinder 37b. The check valve 44 is formed at the lower part of the respective measuring cylinders 37a and 37b as a unified assembly and has a valve mechanism for sucking the resin ingredient or the curing agent and introducing them into the respective measuring cylinders 37a and 37b. Also, the check valve 44 has a valve mechanism for discharging them from the respective measuring cylinders 37a and 37b to a pipe 45. The resin ingredient measuring cylinder 37a and the curing agent measuring cylinder 37b have a cross sectional area ratio equal to a mixing ratio, and are engaged with a piston 43 so that the piston 43 may slide through the cylinders. The end of the piston 43 is fixed on a cylinder plate 38, which is fixed on the cylinder rod of an air cylinder 39 fixed on a base 42 (See FIG. 9.). Returning to FIG. 7, a mixer 41 is connected with the check valve 44 by the pipe 45. A mixed liquids pipe 7 is connected with an exit side. The intermediate part thereof forms a closed container wherein an agitator blade 57 is supported by a bearing part 58 sealed by an oil seal, etc. so that the blade may be freely rotated. The agitator blade 57 is driven and rotated by an air motor 40. Also, a check valve 59 is provided at the inlet from the pipe 45. (See FIG. 10.) An injecting nozzle 6 is connected with the end of the mixed liquids tube 7 and is opened or closed by a valve spool 61 connected with the piston rod of an air cylinder 60. The bearing 62 of the valve spool 61 is sealed by packing. Also, an injecting nozzle 6 is installed on the ceiling plate 65 of the injecting chamber 23 by a nut 63 so that the nozzle 6 may be freely removed or reinstalled. A dispersion-preventing cover 64 is provided at the tip of the nozzle 6. (See FIG. 11.)

The operation of the equipment of the present invention will be explained below. The products 1 are first loaded on the jig 15 at the end of the carrying conveyor 2 so that the products may be correctly positioned in two rows and three lines. Thus, the jig 15 is sent to the preheating furnace 3 and carried at a constant speed in the furnace until the jig reaches the exit of the furnace. The products 1 loaded on the thus carried jig 15 are heated to an appointed temperature, and dried and annealed under suitable conditions for injection. When the jig 15 receives a signal from the limit switch of the vacuum injector 5, the jig 15 is discharged from the preheating furnace 3 and carried to the inlet of the vacuum injector 5 by a preliminary conveyor 4. When the gate valve 29a of the vacuum injection preparation chamber 22 is opened and the rubber belt 27 is driven, the jig 15 is transferred to the inside of the vacuum injection preparation chamber 22 and touches the inner stop limit switch 30a. As a result, the jig 15 stops automatically together with the rubber belt 27. Thereafter, the gate valve 29a is opened and the vacuum injection preparation chamber 22 is evacuated to a prescribed degree of vacuum. Thus, the jig 15 is prepared to be carried to the vacuum injecting chamber 23. The vacuum injecting chamber 23 is evacuated under the optimum conditions for the injection and the mixed resin composition is simultaneously vacuum-injected into the products 1 loaded on the jig 15 through the injecting nozzles 6 at a stretch. When the vacuum injection is completed and the vacuum injection preparation chamber 22 reaches the prescribed degree of vacuum, the gate valve 29b is opened and the rubber belt of the two chambers is driven. Thus, the next jig 15 is transferred to the inside of the vacuum injecting chamber 23 and touches the inner stop limit switch 30b and stops. Here, the gate valve 29b is closed and the vacuum injection preparation chamber 22 begins to prepare for receiving the new jig. The vacuum injecting chamber 23 begins to vacuum-inject the resin composition into the products 1 through the injecting nozzles 6 by one operation. The pressure in the vacuum injection preparation chamber 22 is returned to atmospheric pressure. When a difference in pressure disappears, the gate valve 29a is opened, and a discharge signal is given to the preheating furnace 3. The jig 15 is discharged from the preheating furnace 3, a preliminary conveyor 4 is driven, and the jig 15 is introduced into the vacuum injecting chamber 23. The products 1 on the jig 15 are injected with an appointed amount of the resin composition at the stop position, and the rubber belt 27 is further driven. The belt 27 is stopped by the second inner stop limit switch 31 and injection into the products 1 on the second line is carried out. In the same manner, the rubber belt 27 is stopped by the third inner stop limit switch 32 and injection into the products 1 on the third line is carried out. After the completion of injection into all the products 1 loaded on the jig 15, the jig 15 is sent to the defoaming chamber 4. This transport is carried out simultaneously with the transport from the vacuum injection preparation chamber 22 to the vacuum injecting chamber 23. Thus, the gate valve 29c is opened simultaneously with the opening of the gate valve 29b, and the respective rubber belts 27 provided in the three chambers are simultaneously driven. When the products 1 enter the defoaming chamber 24 together with the jig 15, the gate valve 29c is closed and the defoaming chamber 24 is further evacuated to the prescribed degree of vacuum (5 to 10 Torr) to defoam the injected products 1. The defoaming treatment is carried out for the same period of time as the injection time, and the transport of the jig 15 to the vacuum discharge preparation chamber 25 is carried out when the jig 15 is sent from the vacuum injecting chamber 23 to the defoaming chamber 24. Thus, the transport from the vacuum injection preparation chamber 22 to the vacuum injecting chamber 23 is carried out simultaneously with the transport from the vacuum injecting chamber 23 to the defoaming chamber 24. The vacuum discharge preparation chamber 25 acts for keeping always the vacuum injection preparation chamber 22, the vacuum injecting chamber 23 and the defoaming chamber 24 at vacuum and for improving the injection efficiency of the apparatus. The vacuum discharge preparation chamber 25 receives the thus defoamed products 1 in a vacuum state, and partitions from a defoaming chamber 24 by a gate valve 29d and the pressure in the vacuum discharge preparation chamber 25 is returned to atmospheric pressure. The gate valve 29e is then opened and the jig 15 is discharged onto the injected product conveyor 9. After discharging, the inside of the chamber is rapidly returned to vacuum and prepared for the next discharging. Due to the above-mentioned structure, the charging and discharging are carried out during injection. The vacuum injecting chamber 23 and the defoaming chamber 24 are always maintained at vacuum, and the jig 15 is continuously treated for a definite period of time and then carried to the inlet of the curing furnace 12 by the injected product conveyor 9. The curing conveyor 17 in the curing furnace 12 carries the jig 15 at a constant speed. Therefore, the products 1 can be cured according to the prescribed temperature profile (as shown in FIG. 6) while they pass through the furnace. The gaseous substances generated in the procedures from the injection to the curing are all absorbed by an air conditioning apparatus connected with the barrier dome 10, the heating furnace and the vacuum pump (connected in turn with the vacuum injecting chamber 23. Thus, the working environment can be kept safe. The cured products 1 which have passed the curing furnace 12 are carried back to the start point by the finished product conveyor 46. The finished products 13 are removed, and the uninjected products 14 are newly loaded on the jig 15, which is then transferred onto the carrying conveyor 2 to carry it. Also, at the inlet and exit of the preheating furnace 3 and the inlet and exit of the curing furnace 12, the number of the rows of the jig is successively converted from 1 to 3 or 4 or from 3 or 4 to 1 by the pusher 50 working in response to a switch (not shown) which may detect the arrival of the jig 15.

As described above, according to this equipment, cast high voltage rectifying units can be automatically completed when the jig 15 makes a round. Therefore, the equipment is easy in operation control and excellent in safety.

Next, the injection operation will be further explained. Since a resin ingredient and a curing agent usually contain a large amount of air bubbles, a main tank and a preliminary tank are provided for each of them so that the defoaming treatment of a new material can be performed while the injection is performed. As preliminary tanks are thus provided, the resin ingredient and the curing agent each can be completely defoamed spending a long period of time. For example, an epoxy resin is used as the resin ingredient and an anhydride curing agent is used as a curing agent. When pressurized air is blown into the resin ingredient tank or curing agent tank after the defoaming treatment, the resin ingredient and the curing agent are respectively pressed out into the resin ingredient measuring cylinder 37a and the curing agent measuring cylinder 37b through the resin ingredient pipe 35 and the curing agent pipe 36, respectively. Here, the pistons 43 which have been engaged with the respective cylinders are pushed down by the air cylinder 39. Thus, the prescribed amounts of each material are pressed out to the pipe 45 and pass through the mixer 41, where the two materials are mixed. The resulting mixed liquids are sent to the injecting nozzles 6 by way of the mixed liquids pipe 7. When the injecting nozzles are opened corresponding to the working of the air cylinder 39, a definite amount of the mixed liquids is injected through the injecting nozzles 6.

Thus, when the piston 43 is pushed down and the valve for the injecting nozzles 6 is opened, the same amount of the material as the amount pressed out is injected into the products 1. When the piston 43 is returned to the original position, the valve for the injecting nozzles 6 is closed and new materials are supplemented into the cylinders 37a and 37b from the respective tanks through the check valve 44. Thus, continuous injection can be carried out. Particularly, the resin ingredient pipe 35, the curing agent pipe 36, the resin ingredient measuring cylinder 37a, the curing agent measuring cylinder 37b, the mixer 41 and the check valve 44 are closed to isolate the external atmosphere completely. In the respective tanks, the resin ingredient is completely defoamed in 3.5 to 5 hours to a pressure of 2.5 Torr, and the curing agent is completely defoamed in 2 to 4 hours to a pressure of about 1.8 Torr. The resin composition is injected into the products 1 placed in a vacuum atmosphere at 5 to 10 Torr in the vacuum injecting chamber through the injecting nozzles 6 at a slow speed in 30 seconds by one operation. Thus, injection can be smoothly carried out without the overflow or dispersion of the resin composition. Therefore, it is unnecessary to remove the squeezed-out resin composition and it has simplified the automatic operation of the present equipment. Also, since the defoamed resin ingredient and the defoamed curing agent are mixed immediately before the injecting nozzles 6, the route from the mixer to the injecting nozzles wherein the resin composition hardens when the operation of the present equipment is stopped is remarkably shortened. Therefore, the area of the zone to be cleaned is narrow and the operation of the equipment can be readily resumed.

As described above, according to the present invention, the procedures from the injection step to the curing step which have heretofore given rise to troubles with regard to safety can be completely automated. Thereby, safety can be ensured and operation efficiency can be remarkably improved. Further, according to the present invention, batch treatment steps can be removed and all the steps can be continuously carried out. Therefore, high voltage rectifying units can be produced under all the same conditions, and the quality of high voltage rectifying units can be further stabilized. Also, in the equipment of the present invention, a vacuum injecting chamber and a defoaming chamber arranged adjacent to said vacuum injecting chamber in which defoaming is carried out at a different degree of vacuum from that in the injection step are provided, and in said vacuum injecting chamber a resin composition in a defoamed state is injected into a high voltage rectifying unit. Therefore, the whole amount of the resin composition can be injected into a high voltage rectifying unit by a stretch substantially without the dispersion of the resin compositions. As a result, operation efficiency can be improved and the appearance and the other properties of a high voltage rectifying unit can be remarkably improved. Also, plurality of high voltage rectifying units are loaded on a jig and carried from a vacuum injecting chamber to a curing furnace by a carrier apparatus. It facilitates the transport of high voltage rectifying units in the present equipment and can simplify the attachment and withdrawl of high voltage rectifying units to and from the carrier apparatus, resulting in an improvement in operation effect. Also, since a vacuum preparation chamber is provided before an injecting chamber and after a defoaming chamber, respectively, in the present invention, the time for which the vacuum injecting chamber and the defoaming chamber each must be kept at a vacuum state can be shortened and a high voltage rectifying unit production cycle can be shortened. Also, according to the present invention, high voltage rectifying units can be continuously produced only by carrying out the charge of uninjected high voltage rectifying units and the withdrawl of the finished product at one place.

We claim:

1. An equipment for producing a high voltage rectifying unit, which equipment is provided with:
   (a) a defoaming means for storing and vacuum-defoaming a resin ingredient and a curing agent, respectively, alone;
   (b) a mixing means for mixing said resin ingredient and said curing agent at a prescribed mixing ratio which is connected with said defoaming means by a closed piping;
   (c) a vacuum injecting chamber for injecting an appointed amount of the mixed and defoamed thermosetting resin composition into an assembled high voltage rectifying unit in a vacuum state through injecting nozzles connected with said mixing means by a closed piping, which vacuum injecting chamber is equipped with the first carrier apparatus which may load and intermittently carry said high voltage rectifying unit;
   (d) a defoaming chamber for defoaming the resin composition injected into the high voltage rectifying unit by evacuating to an appointed degree of vacuum which is provided adjacent to said vacuum injecting chamber and is equipped with the second carrier apparatus which may load and carry the inserted high voltage rectifying unit;
   (e) a curing furnace for heating and curing continuously the resin composition-injected high voltage rectifying unit so that an appointed temperature profile may be formed along the carrying route of the third carrier apparatus, which is equipped with said third carrier apparatus for carrying the resin composition-injected high voltage rectifying unit through the curing furnace; and
   (f) the fourth carrier apparatus for carrying said high voltage rectifying unit from said defoaming chamber to said curing furnace, which fourth carrier apparatus is covered to isolate the external atmosphere, and in which equipment the procedures from the vacuum injection of the thermo-setting resin composition into the high voltage rectifying unit to the curing of the resin composition can thereby be carried out continuously and automatically.

2. An equipment for producing a high voltage rectifying unit according to claim 1, wherein a jig on which plurality of high voltage rectifying units are positioned and placed in the lump is provided, and said jig is loaded and carried on said first to fourth carrier apparatuses.

3. An equipment for producing a high voltage rectifying unit, which equipment is provided with:
   (a) a defoaming means for storing and vacuum-defoaming a resin ingredient and a curing agent, respectively, alone;
   (b) a mixing means for mixing said resin ingredient and said curing agent at a prescribed mixing ratio which is connected with said defoaming means by a closed piping;
   (c) a preheating furnace for preheating and drying an assembled high voltage rectifying unit, which is equipped with the fifth carrier apparatus which may carry said high voltage rectifying unit through the preheating furnace;

(d) the first vacuum preparation chamber formed in a vacuum atmosphere which is equipped with the sixth carrier apparatus for inserting the high voltage rectifying unit discharged from said preheating furnace into the first vacuum preparation chamber through a gate which may be opened and closed and carrying the unit;

(e) a vacuum injecting chamber for injecting an appointed amount of the mixed and defoamed thermosetting resin composition into said high voltage rectifying unit in a vacuum state through injecting nozzles connected with said mixing means by a closed piping, which vacuum injecting chamber is provided adjacent to said first vacuum preparation chamber and is equipped with the first carrier apparatus which may load and intermittently carry said high voltage rectifying unit inserted into the vacuum injecting chamber through a gate which may be opened and closed (f) a defoaming chamber for defoaming the resin composition injected into the high voltage rectifying unit by evacuating to an appointed degree of vacuum which is provided adjacent to said vacuum injecting chamber and is equipped with the second carrier apparatus which may load and carry said high voltage rectifying unit inserted into the defoaming chamber through a gate which may be opened and closed;

(g) the second vacuum preparation chamber formed in a vacuum atmosphere which is provided adjacent to said defoaming chamber and is equipped with the seventh carrier apparatus for carrying the high voltage rectifying unit inserted into the second vacuum preparation chamber through a gate which may be opened and closed;

(h) a curing furnace for heating and curing continuously the resin composition-injected high voltage rectifying unit so that an appointed temperature profile may be formed along the carrying route of the third carrier apparatus, which is equipped with said third carrier apparatus for carrying the resin composition-injected high voltage rectifying unit through the curing furnace; and (i) the fourth carrier apparatus for carrying said high voltage rectifying unit from said defoaming chamber to said curing furnace, which fourth carrier apparatus is covered to isolate the external atmosphere, and in which equipment the procedures from the vacuum injection of the thermo-setting resin composition into the high voltage rectifying unit to the curing of the resin composition can thereby be carried out continuously and automatically.

4. An equipment for producing a high voltage rectifying unit according to claim 3, wherein a jig on which plurality of high voltage rectifying units are positioned and placed in the lump is provided, and said jig is loaded and carried on said first to seventh carrier apparatuses.

5. An equipment for producing a high voltage rectifying unit according to claim 4, wherein said preheating furnace and said curing furnace are connected by way of the place where the high voltage rectifying unit is placed on or withdrawn from said jig and the high voltage rectifying unit is circulated starting from said place to effect the continuous production of the high voltage rectifying unit.

* * * * *